United States Patent
Jansa et al.

(10) Patent No.: US 11,592,061 B2
(45) Date of Patent: Feb. 28, 2023

(54) PLAIN BEARING, PLASTICS SLIDING ELEMENT, SYSTEM AND METHOD FOR WEAR DETECTION

(71) Applicant: igus GmbH, Cologne (DE)

(72) Inventors: Darius Jansa, Cologne (DE); Konstantin Schmer, Cologne (DE); Stefan Niermann, Ratingen (DE)

(*) Notice: Subject to any disclaimer, the term of this patent is extended or adjusted under 35 U.S.C. 154(b) by 920 days.

(21) Appl. No.: 16/095,171

(22) PCT Filed: Apr. 21, 2017

(86) PCT No.: PCT/EP2017/059571
§ 371 (c)(1),
(2) Date: Oct. 19, 2018

(87) PCT Pub. No.: WO2017/182662
PCT Pub. Date: Oct. 26, 2017

(65) Prior Publication Data
US 2019/0145462 A1    May 16, 2019

(30) Foreign Application Priority Data
Apr. 21, 2016 (DE) .................. 20 2016 102 133.2

(51) Int. Cl.
*F16C 33/20* (2006.01)
*F16C 41/00* (2006.01)
(Continued)

(52) U.S. Cl.
CPC ............ *F16C 33/20* (2013.01); *F16C 17/246* (2013.01); *F16C 41/008* (2013.01); *G01M 13/04* (2013.01)

(58) Field of Classification Search
CPC ...... F16C 17/246; F16C 33/20; F16C 41/008; G01M 13/04
See application file for complete search history.

(56) References Cited

U.S. PATENT DOCUMENTS

| | | | |
|---|---|---|---|
| 5,969,260 A | 10/1999 | Belk et al. | |
| 2008/0159674 A1* | 7/2008 | Varonis | G01P 3/443 374/E13.01 |

(Continued)

FOREIGN PATENT DOCUMENTS

WO    WO-2010066396 A1 *   6/2010   ............. C08L 79/08

*Primary Examiner* — Son T Le
*Assistant Examiner* — Adam S Clarke
(74) *Attorney, Agent, or Firm* — Cahn & Samuels, LLP (57) ABSTRACT

Wear detection in a plain bearing is proposed, with a first component comprising at least one sliding element of plastics material, which has a sliding surface for mobile guidance of a second component relative to the first component. The first component, in particular the sliding element, has a device for detecting wear in a critical region of the sliding element, in particular at the sliding surface thereof, with a transponder and with a detector element which cooperates with the transponder and is arranged on the sliding element. The detector element changes the behavior of the transponder when a predetermined degree of wear is reached in the critical region of the plastics sliding element, such that the wear-induced change is wirelessly detectable. The system and detection method are particularly advantageous for plain bearings for a lubricant-free bearing arrangement.

18 Claims, 6 Drawing Sheets

(51) Int. Cl.
*F16C 17/24* (2006.01)
*G01M 13/04* (2019.01)

(56) References Cited

U.S. PATENT DOCUMENTS

| | | | | |
|---|---|---|---|---|
| 2009/0140840 A1* | 6/2009 | Corts | ............. | F16C 41/008 |
| | | | | 340/10.1 |
| 2010/0295694 A1* | 11/2010 | Kauffman | ......... | G06K 19/0716 |
| | | | | 340/665 |
| 2014/0140648 A1* | 5/2014 | Ito | ............. | F16C 33/586 |
| | | | | 384/448 |
| 2016/0208849 A1* | 7/2016 | Gorges | ............ | G01L 5/0014 |
| 2016/0298691 A1* | 10/2016 | Dowie | ............ | F16C 7/06 |
| 2017/0122366 A1* | 5/2017 | Kuhlmann | ............ | G01B 7/144 |

* cited by examiner

PLAIN BEARING, PLASTICS SLIDING ELEMENT, SYSTEM AND METHOD FOR WEAR DETECTION

FIELD

The invention lies in general in the field of mechanical engineering bearing technology, i.e. "bearings" for guiding components which are movable relative to one another, and in particular in the field of "plain bearings", in contrast to "rolling bearings".

The invention relates more specifically to a plain bearing for a maximally maintenance-free and lubricant-free bearing arrangement and a sliding element therefor, namely a sliding element of an engineering plastics material with tribologically optimized characteristics for reducing friction between the moving parts.

BACKGROUND

Plain bearings in the sense as used here have a first component comprising at least one sliding element of plastics material, which has a sliding surface for mobile guidance of a second component relative to the first component, in particular by lubricant-free solid friction. The sliding element may in this case be used as an additional component, for example as a plain bearing bush, for mechanical decoupling of two components movable relative to one another. The sliding element of plastics material may also itself form the bearing-mounting or bearing-mounted component of the mechanical bearing arrangement. The guided component may be made from metal.

The present case in particular considers plain bearings with solid friction ("dry friction", i.e. without fluid-film lubrication), wherein at least one friction partner is made of plastics material. Modern plastics plain bearings use special plastics materials which may optionally have "self-lubricating" properties, and in the last few decades have become some of the most important types of lubrication-free and maintenance-free plain bearings.

Due to the inherent friction, a degree of wear, in particular deterioration caused by abrasion, is inevitable in plain bearings. Wear defines the intended service life of the plain bearing or, for instance in the case of improper use or overloading, possibly also an earlier failure point.

The invention therefore relates to a system for detecting wear (or deterioration) in plain bearings of the type in question and the application of said system. The invention relates primarily to a plain bearing and a sliding element which are suitable for wear detection. It is desirable for said wear detection to take place in contactless or non-contacting manner.

RFID systems for contactless detection are known from electrical engineering. These serve primarily in contactless location and identification of objects. RFID systems substantially consist of at least one transponder, often also known as an RFID tag, which contains identification information and a corresponding reader which is capable of reading the identifier. The reader generates radio waves, i.e. an electromagnetic alternating field, to which the transponder is exposed. Passive transponders draw part of the electrical field energy via their antenna and use this for their own power supply during communication. Active transponders have their own power source. In both cases, the transponder modulates a response in the alternating field, which is detected by the reader. RFID transponders are small, robust and very cheaply obtainable, since they are manufactured in large numbers and have a simple structure. They are therefore already widely used and for example have for decades been attached to goods to protect against theft. More recently, RFID systems have been used for example to identify identity papers, to immobilize vehicles or indeed for banknotes.

The use of RFID systems is also already known in mechanical engineering in general, in particular in the case of bearings and specifically in the production and application of rolling bearings.

U.S. Pat. No. 7,534,045 B2 describes a rolling bearing with a special holder for an RFID tag, which stores a plurality of items of information relating to the rolling bearing permanently and in contactlessly retrievable manner, for example type name, tolerance details, special requirements, time of manufacture and lot number, etc. U.S. Pat. No. 6,501,382 B1 in a similar disclosure also proposes using the RFID tag to detect authenticity or product counterfeiting. More extensive use of the RFID tag is not described in either case.

Patent application WO 2009/127190 A1 discloses a specific embodiment of an RFID transponder antenna which is designed for use in components predominantly of metal, in particular in rolling bearings, but also in plain bearings and linear guides consisting of metal components. The antenna has a simple slot shape which may be very largely independent of the bearing shape. This makes it possible to prevent difficulties resulting inter alia from inherent shielding by metal parts.

Patent application DE 10 2007 009 093 A1 discloses a rolling bearing assembly with running surfaces and rolling elements therebetween. Arranged on a rolling element is an active RFID tag with memory, which buffers forces determined by an additional sensor on the rolling element and relays them wirelessly.

The above-stated RFID solutions enable identification of products and reading out of stored data. In conjunction with further sensors, these solutions in part also enable condition testing and theoretically wear detection.

Additional sensors for determining physical variables would have to be supplied with power and entail additional expenditure. This leads to cost increases, which cancel out the considerable advantages of plastics plain bearings, namely simplicity of design and their generally considerably lower cost compared with rolling bearings of a conventional metal design.

DE 102 27 677 A1 discloses a device for remote monitoring of the condition of a machine part subject to progressive operational wear using at least one electrical conductor track structure which is mounted on the machine part in such a way that it wears together with the machine part during operation. Said remote monitoring, for example of a cutting tool, is achieved by means of a transponder and is very expensive to produce inter alia due to the conductor track structure.

SUMMARY

It is therefore a first object of the present invention to propose a solution for contactless condition testing, in particular for contactless wear detection, in a plain bearing or in a sliding element for such a plain bearing. The solution needs to be of simple construction and inexpensive to produce.

According to a first aspect of the invention, in a plain bearing, it is proposed to achieve the first object mentioned above in that the first component has a device for detecting wear in a critical region of the at least one sliding element of plastics material. The critical region may be a part of the sliding surface (when new), adjoin the latter or in particular be directly adjacent to this sliding surface in the direction of progressive wear. In principle, the critical region contains a limit for the admissible wear and sub-regions separate therefrom in which the wear may still be considered non-critical or indeed already critical. The critical region should be provided at a location susceptible to wear.

According to the first aspect of the invention, the device for contactless wear detection has a transponder and a detector element. The detector element in this case cooperates with the transponder and is configured and arranged on the sliding element in such a way that the detector element changes the behavior of the transponder in the event of a predetermined degree of wear in the critical region. As a result of this configuration, the wear-related change may be detected wirelessly using the transponder itself, i.e. without contact with the component to be tested. This in particular also enables ongoing monitoring without interrupting operation. An electrotechnical mode of action is advantageous, with a view to possible automation, in particular in the case of a plurality of plain bearings to be monitored.

The predetermined degree of wear may in particular represent an abrasion-related wear limit relative to new, which is achieved in proper use towards the end of the nominal service life of the sliding element. In other words, it is a limit which, once it has been exceeded, means reliable operation is no longer guaranteed.

The wear to be detected may be any type of bearing-specific deterioration or wear, for example wear resulting from abrasion, cracking and/or fatigue fracture, in particular however wear by abrasion to the sliding surface due to solid friction between the sliding element of plastics material and the component to be bearing-mounted thereby, which may for example be made from metal.

Because, in the event of a predetermined degree of wear in the critical region, the detector element substantially only changes the behavior of the transponder, such that this wear-related change, for example relative to nominal behavior, is wirelessly detectable, an electrotechnically simple solution may be achieved without distinct sensor components and the like. An inherent or readily adapted component of the transponder is in particular suitable as the detector element.

The invention is based inter alia on the surprisingly simple recognition that identification of a critical degree of wear does not require a measurement as strictly defined, i.e. for quantitatively determining a variable. Due to the contactless detection, it is moreover immaterial whether the device for wear detection is provided on a component of the bearing arrangement which is stationary or is moving relative to the machine or the apparatus.

Transponders which are suitable for the solution according to the invention or are adaptable with little effort are already obtainable at very low unit costs. Owing to the wireless detectability on the one hand, combined on the other hand with the detector element which determines the behavior of the transponder, the solution according to the invention inter alia avoids expenditure on sensors, installation thereof, wiring etc. In addition, the detector element may be of passive, robust embodiment, with a very low weight and extremely small size. The invention thus inter alia avoids any imbalance and allows installation in principle even in small sliding elements of plastics material, for example plastics bearing bushes with a low wall thickness and small diameter. The sliding element may itself form the component to be bearing-mounted (i.e. the one component of the bearing arrangement consists of the sliding element), or constitute one of several component parts thereof. A higher-level bearing housing may for example be provided, for instance if the plain bearing is embodied as a housed bearing. In particular but not solely in the former case, a compact construction of transponder and detector element is advantageous.

In one exemplary embodiment which is simple to manufacture, the sliding element has a recess in its sliding surface in which the detector element is arranged, preferably fully accommodated therein, in particular together with the transponder. The recess may extend from the sliding surface and makes it possible to provide the detector element offset inwards in particular relative to the sliding surface in the direction of progressive wear, i.e. remote from the relatively mobile other component. In this way, or by suitable selection of the spacing between the sliding surface (when new) and the operating point of the detector element, it is possible to specify or predetermine the admissible degree of wear as desired. If the wear reaches this limit, the detector element responds, for example by destruction or abrasion-related conductor interruption.

The detector element, optionally together with the transponder, is preferably accommodated in a receptacle in the sliding element of plastics material and embedded with the sliding element therein, i.e. the detector element or the transponder are held relative to the outside, preferably tightly enclosed or surrounded, by encompassing material. This material may be identical to the plastics material of the sliding element or different therefrom, in particular less wear-resistant. Preferred integrally bonded incorporation in the body of the sliding element may be achieved in different ways, for example by encapsulation during manufacture by injection molding, by molding on or subsequent filling, by additive methods etc. Integrally bonded connection of the enclosing material with the plastics material of the sliding element enables encapsulation and/or fixing in position.

So as to impair bearing function of the sliding element as little as possible, the area dimension of the recess (in the sense of the base area projected onto the sliding surface) should be as small as possible in relation to the area dimension of the sliding surface itself, in particular less than 20%, preferably less than 10%.

In one particularly inexpensive embodiment which is easy to handle during manufacture, the transponder and the cooperating detector element are integrated into a detection module. The detection module may for example be made in the form of a passive RFID transponder or using corresponding technology. The dimensions of the module are here preferably markedly smaller than the corresponding dimensions of the plastics sliding element. The detection module is in this case arranged on the at least one plastics sliding element to be monitored in such a way that the detector element lies in the critical region, in particular with an operating region on the wear limit. To this end, the plastics sliding element may have prefabricated receptacles or recesses.

Alternatively, the detector element may be connected as a separate component to a conventional commercial transponder, for example an RFID transponder or RFID tag. Thus, for example, in the case of particularly small sliding elements, the transponder may be remote from the sliding surface and provided outside the critical region. Only a small-sized detector element, for example a conductor in the form of a shunt of a circuit, is in this case guided into the critical region.

Each transponder preferably has precisely one detector element to increase the number of items. The sliding element accordingly preferably has one transponder with precisely one detector element. Alternatively, one transponder may be associated with a number n of detector elements on one or on n plastics sliding elements, which optionally in each case act on the common transponder via a relatively short detector line. The number n should however be kept as low as possible.

An n:1 ratio with n detector elements per transponder allows more reliable detection but is more expensive. For instance, in the case of a plain bearing of multipart construction, i.e. if a number of sliding elements are provided in the first component, some or all of the sliding elements may in each case have a detector element, and the detector element may be connected with a common transponder, preferably an RFID transponder with a microchip, which has terminals for connection with the individual detector elements. If detector elements corresponding to different wear limits are arranged on one and the same plastics sliding element or on different sliding elements and cooperate with a common transponder, for example an RFID transponder with microchip, different stages of wear may for example be identified. The microchip may to this end comprise a plurality of inputs for connection of the individual detector elements, and send an item of information dependent on the condition thereof as a change to a reader. A suitable reader is in particular a transceiver capable of transmitting and receiving.

The change in transponder behavior detectable by a reader or a transceiver may take many different forms, in particular that of an electrotechnically measurable parameter change. A line interruption or a line short-circuit, which influences the operational readiness of the transponder, can be particularly simply detected. In this way, the detector element may in particular disable operation of the transponder or shut it down. The circuit topology may for example be modified by the critical wear, or an electrotechnically measurable or functionally relevant parameter, such as for example the impedance values of a resonant circuit in the transponder etc., can be changed. The crucial factor with regard to the principle is that the transponder, as an indicator for wear detection, displays a detectably different behavior when an admissible degree of wear is reached or exceeded, and this may be detected by radio or wirelessly. Thus, a line interruption may bring about the change in behavior for example via a detector line towards the critical region(s). It is for example also possible for a part of the transponder antenna itself to be exposed to wear in the critical region to such an extent that it fails if the predetermined degree of wear is reached or exceeded in the critical region.

The above-described first object is also achieved inter alia by a sliding element. The invention therefore also relates, according to a further, independent aspect, to a sliding element of a tribological plastics material for a plain bearing for a lubricant-free bearing arrangement, comprising a transponder and a detector element for electrotechnical and contactless wear detection. The detector element is provided in a critical region of the sliding element which is susceptible to wear, in particular by solid friction-induced deterioration, and, in response to wear, changes the behavior of the transponder at a predetermined degree of wear in the critical region. The sliding element may have one or more of the above-stated or following preferred features, even including the degrees of freedom.

In both aspects, the detector element preferably changes the radio behavior of the transponder.

The tribologically optimized plastics material may consist of a base polymer with contents of solid lubricant particles, reinforcing materials, for example engineering fibers, and/or fillers in the form of additions or additives. In this case, the mixture of materials is preferably suitable for injection molding and is homogeneous.

In one embodiment, a detection module may be provided which has a carrier or a housing with a transponder comprising a housing, and a region separate therefrom of the carrier or housing in which a detector element is arranged in the manner of a predetermined breaking point which, in the event of wear-induced breakage, changes the behavior of the transponder. The carrier may for example comprise a flexible self-adhesive label. On the other hand, for example, a resin encapsulation of a conventional transponder with an application-adapted additional detector element is suitable as the housing. The module housing may also be injection-molded jointly with a radio circuit, in particular also together with the plastics plain bearing element, for example using the multicomponent and/or IMPIM (integrated metal/plastics injection molding) method. The detection module may be arranged in such a way that the detector element is located in the predetermined critical region which is to be monitored.

In a further embodiment, a number of plastics sliding elements each have at least one detection module in each case in a wear-susceptible region of the bearing arrangement. This allows stochastically reliable detection even where it is difficult to predict the plastics sliding element most susceptible to wear and/or in the case of a given transponder error rate, for example a given false-positive or false-negative rate, as is conventional in the case of very cheap passive transponders.

The detector element preferably cooperates electrotechnically, in particular in a circuit, with the transponder. It may be connected as a separate component with the transponder, such that triggering behavior may be selected as desired.

The detector element may be embodied as an existing or modified component of an already known transponder, so minimizing manufacturing costs.

In a simple embodiment, the detector element is embodied as a line portion of a detector line, which extends in the critical region, for example is exposed like a predetermined breaking point to the predetermined degree of wear, and is intended to be interrupted when the predetermined degree of wear is reached. Depending on the circuit arrangement, interruption may prevent and/or (re)establish operational readiness of the transponder.

In a variant which enables operational readiness as a function of wear, i.e. as it were switches on the transponder, the transponder has an antenna which is short-circuited via the detector element in the unused new state of the plain bearing or sliding element. Depending on the fundamental frequency of the transponder, consideration is given, instead of a (low frequency) "short-circuit", to a change from an impedance mismatch to a satisfactory match or power transfer from or to the antenna, for example via open or short-circuited stubs, which are changed in response to wear. This makes it possible to embody the detector element such that it opens the "short-circuit" or switches from mismatch to match when the predetermined degree of wear is reached, so enabling antenna function. The transponder is thus detected by the reader only when the wear limit is reached.

Alternatively, the transponder may be taken out of operation if the detector element is embodied as a component part of the antenna itself which extends in the critical region in such a way that the antenna is interrupted or becomes unfit to function when the predetermined degree of wear is reached. This solution is advantageous in the case of transponders with an appreciable radio error rate, since it may firstly be ensured that the transponder is responsive. In addition, a nominally operational transponder may be used for the conventional RFID functions, for example product information etc.

In particular but not exclusively for passive transponder configurations or transponder configurations supplied autonomously from the radio transmission power, it is advantageous for the antenna to be embodied as an induction coil or to comprise an induction coil. Dipole antennas are also possible, in particular for higher frequency ranges, and are generally smaller than induction coils.

An induction coil in the form of an antenna may, in particular in the case of passive transponders, be a component part of a resonant oscillating circuit in the transponder which, as a harmonic or vibration absorber, brings about a change in the electromagnetic field, measured by the reader or transceiver, at the resonant frequency. The "frequency deviation" method is known for this purpose, in which the reader varies, i.e. wobbles, the frequency over a range about the resonant frequency in order to detect field collapse by means of the transponder in the event of resonance. Corresponding transponder circuits in the form of EAS tags, which were originally developed to secure against theft, are disclosed for example by prior U.S. Pat. Nos. 3,810,147 and 3,500,373. In such systems the transponders can be produced extremely cheaply, for example as adhesive labels, these consisting substantially just of the resonant oscillating circuit with the induction coil and a capacitor. In addition, in these systems the readers also consume only a small amount of electrical power.

For large numbers of items, passive transponders, in particular "1-bit transponders" or "single bit transponders" are suitable, i.e. transponders which merely transmit the information: "transponder in working zone: yes" and "transponder in working zone: no" (i.e. 1 bit). To this end, the following transponder configurations are in particular also feasible:

transponders in the form of the above-mentioned RF (radio frequency) LC resonant oscillating circuits (RF systems, for example from Checkpoint Systems http://us.checkpointsystems.com/or Agon Systems: http://www.agon-systems.com), for example for 8.2 MHz fundamental generator frequency: these are very cheap and energy-efficient over short to medium ranges (remote coupling range: up to a few meters);

transponders for frequency multiplication in the microwave range, which generate generator frequency harmonics, typically in the microwave range, for example by means of a dipole antenna with capacitance diode: these result in substantially no false detection or false alarms over a long range (to over 10 m);

transponders as frequency dividers in the long wave range, for example between approx. 90 and 140 kHz, with a microchip and a resonant circuit coil: with a similarly low error rate;

transponders for the electromagnetic (EM) method in the LF range up to approx. 22 kHz, which detect periodic magnetic reversal of a magnetically soft metal: these are particularly suitable for plain bearings predominantly comprising metal parts (except for plastics sliding elements), but have a given error rate (typically approx. 25-30%) and a short range (up to approx. 2 m); or transponders for the acoustomagnetic (AM) method based on the principle of magnetostriction, for example 58 kHz from Sensormatic (http://www.sensormatic.com): these have a medium to long range up to approx. 20 m with a low error rate but very high energy consumption.

Passive transponders of the above types may in particular be switched off or become inactive (for example be put out of action or completely destroyed) due to wear, for example by arranging as detector element a functionally relevant component in the form of a predetermined breaking point in the critical region.

In the case of passive transponders with an appreciable error rate it is advantageous to construct a system with a number of redundant transponders. Redundancy makes it possible for excess wear to be signaled only when a plurality of or all the independent transponders do not produce a return signal. Thus, with a sufficiently independent arrangement, for example by spatial variation, the risk of false alarms (false positives) is reduced to a negligible probability.

As an alternative to passive single-bit transponders of the above-stated types, according to a further aspect the transponder may preferably be embodied as a passive or active RFID transponder, with a microchip storing identification information or an identifier. In this case, the transponder preferably comprises an antenna for wireless communication in the ISM band, which optionally eliminates the need for regulatory approval, even in the case of relatively large transmit powers for relatively long ranges.

Active RFID transponders allow longer wireless monitoring ranges for example for wiring arrangements with a long travel path (>>2 m). Supply of power to the active RFID transponder(s) may be simplified by the stationary component of the bearing arrangement comprising the detection device, or indeed by the power being obtained from the kinetic energy (for example by induction).

The identification information of a passive or active "genuine" RFID transponder may be interrogated via the reader. Thus, for example, a plausibility check, location and/or identification of the bearing arrangement to be maintained may be enabled.

In RFID systems, one particular possibility is for the transponder to be switched on by the detector element only upon reaching the critical degree of wear, so as to minimize instances of false detection.

Irrespective of the selected transponder technology, it may be desirable, for functional testing, in particular in the event of detection by means of transponders switched on in response to wear, to provide a further independent test transponder, preferably for the same frequency range as the reader, on a plain bearing to be monitored. The behavior of the test transponder preferably does not change in response to wear, i.e. it is preferably operational in the new state.

The monitoring or test transponder should not be exposed to wear, for example it should be embodied without a detector element, but otherwise arranged as similarly as possible to the transponder for wear detection in the radio range. The test transponder may provide product information.

In one particularly simple and inexpensive embodiment, the transponder is produced on a self-adhesive label, preferably together with the detector element.

It is likewise within the scope of the invention for the detector element not itself to be impaired by the wear but rather to act as a transducer which monitors a predetermined breaking point on the plastics sliding element. To this end, the sliding elements may each have a predetermined breaking point in the critical region which triggers the detector element when the predetermined degree of wear is reached. The detector element may in this case be embodied as a simple electromechanical switching means, which optionally allows more targeted adjustment of the wear limit, irrespective of the electrotechnical components. For instance, an identical detection module may be used irrespective of the construction of the sliding element in each case for a plurality of sliding element types.

An embodiment in which the detector element is embodied as a passive circuit component or as a conductor portion, for example as a conductor loop through the critical region with an inflection point or inflection portion at the wear limit, is particularly inexpensive. The detector element itself may for instance form a type of predetermined breaking point in the critical region which breaks when the predetermined degree of wear is reached, and be connected with the transponder as part of a detector line. In this case, the detector element may in particular take the form of a conductor loop acting as a shunt.

If the bearing-mounting component in which the component to be bearing-mounted is guided (with the exception of the device for detecting wear) predominantly or exclusively comprises plastics component parts, the radio field is barely or not significantly impaired by the material of the plain bearing. The first bearing-mounting component, i.e. the frame for the purposes of the mechanical system, may therefore consist of the at least one or of a plurality of sliding elements of plastics material and the device for detecting wear. Alternatively, it may also have an additional bearing housing for mounting the sliding element(s), wherein the bearing housing is preferably likewise made from a plastics material or an electrically poorly conductive material.

There is conversely absolutely no reason why the second component, in addition to the plain bearing, needed for the finished plain bearing arrangement, for example a shaft, a rail, a joint head or the like, should not be made of metal, since internal components generally do not have an interfering effect on the electromagnetic field.

The finished plain bearing arrangement may have a plain bearing embodied for a pivot bearing, a linear guide, an axial-radial bearing or a spherical plain bearing, which plain bearing mounts the second component with a corresponding degree or corresponding degrees of freedom.

Apart from the sliding element(s) of plastics material, the precise type of plain bearing arrangement does not matter.

Together with the sliding element per se, the invention also relates, according to a further independent aspect, to a system for electrotechnical wear detection comprising a plain bearing with at least one transponder, the behavior of which changes if a predetermined degree of wear is reached, and a reader cooperating wirelessly with the transponder for wireless monitoring of transponder behavior. In addition to automatic signaling of excess wear, the system may have further helpful functions, for example emergency tripping to stop the machine, installation or the like which requires the bearing arrangement;
a data interface to a maintenance alarm system; and/or to an inventory control system, for example for partly or fully automated ordering of a replacement plain bearing.

According to a further independent aspect, the invention also relates to a method for contactless detection of wear to a plain bearing. In this case, it is in particular deterioration to a sliding surface caused by intended solid friction of the plain bearing which causes the wear to be monitored. The method is distinguished for the purposes of the invention in that the behavior of a transponder arranged on the plain bearing changes when a predetermined degree of wear is reached. This change is detected wirelessly via a reader or a transceiver, for example for the purpose of triggering a maintenance alarm and/or an emergency stop or the like.

BRIEF DESCRIPTION OF THE DRAWINGS

Further features of the invention are revealed by the appended figures, on the basis of which preferred exemplary embodiments of the invention are explained below without restricting the general nature of the above description. Identical or similar elements are labeled with the same reference signs in the figures, in which.

DETAILED DESCRIPTION

FIGS. 1A-1E show by way of example a plain bearing 2 embodied as a radial bearing or pivot bearing, with a first component 3, which consists substantially of a sliding element 4 of plastics material in the form of a circular cylindrical bush. A second component 5 is here shown (only schematically) as a rotating part, for example in this case an axially extended shaft. The first component 3 guides the second component 5 rotatably with a predetermined degree of freedom, for example about a predetermined axis of rotation A, which is here defined by the axis of an internal circular-cylindrical sliding surface 6 of the sliding element 4. The construction according to FIGS. 1A-1E may also be used as a linear guide along the axis A or as a rotary guide for translational movement along the axis A and rotation about the axis A.

The sliding element 4 consists of a per se known tribologically optimized high performance plastics material, for example a suitable Iglidur® material made by igus GmbH, DE-51147 Cologne. Details about the construction of a plain bearing 2 and the sliding element 4 which are immaterial here and are known per se to a person skilled in the art are not explained in any greater detail.

According to the invention, the first component 3 additionally has a radio circuit 10, which is provided in a critical region 8. The critical region 8 is here a first portion of the wall thickness of the sliding element 4 starting from the sliding surface 6 in the direction of increasing wear, for example the first 25% of the wall thickness in the radial direction. In FIGS. 1A-1E, the radio circuit 10 is arranged in an interior recess 7 in the sliding element 4 provided specifically for this purpose. The radio circuit 10 is embodied in FIGS. 1A-1E for example in the form of a two-dimensional adhesive label with an RFID tag. In FIGS. 1A-1D, the radio circuit 10 is wholly accommodated in the recess 7 and fastened to the long side or bottom of the recess 7.

The recess 7 opens into the sliding surface 6 and extends for example to around 20% of the wall thickness, with a bottom extending circular-cylindrically and coaxially with the sliding surface 6. The location where the radio circuit 10 is fastened, i.e. the position of the recess 7 in the sliding element 4, is selected spatially such that it lies in the cylinder segment 9 of the first component 3 intended for predominant loading, i.e. where maximum frictional force is generated during operation, for example by upwardly acting loading on the first component 5, as may be seen for example in FIG. 1B by the minimal gap in the loaded cylinder segment 9.

The radio circuit 10 is fastened to the bottom of the recess 7 at a distance from the sliding surface 6 and thus lies spaced radially, relative to the axis A, from the sliding surface 6 (roughly in accordance with the depth of the recess 7 minus the thickness of the two-dimensional radio circuit 10). The spacing, adjustable by the depth of the recess 7, corresponds to a wear limit W to be determined and thus also specifies the degree of abrasion-related deterioration of the sliding surface 6 at which the deterioration also destroys the radially remotely arranged radio circuit 10, i.e. makes it non-operational. In other words, once the deterioration has perceptibly exceeded the wear limit W, the radio circuit 10 is mechanically impaired or destroyed and for example no longer provides the nominal radio behavior it does when new and intact. The radio circuit 10 is then for example no longer able properly to return the RFID tag identifier. The radial depth of the recess 7 is >W and selected such that the sliding element 4 remains functional until the wear reaches this depth. This offers a safety margin for further operation until the sliding element 4 or the entire plain bearing 2 can be replaced.

Figure 1A:
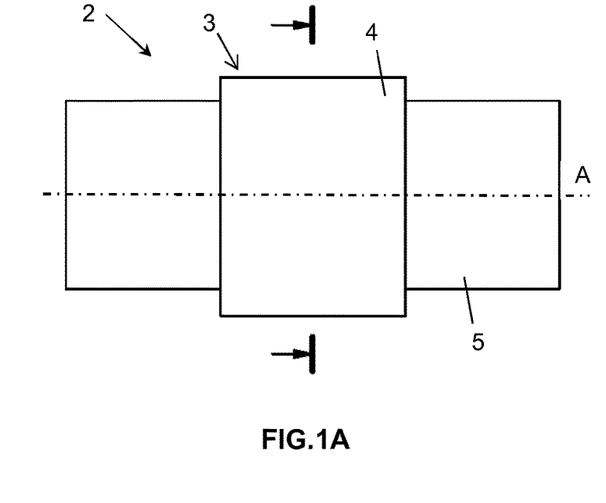
FIGS. 1A-1E show views of an exemplary plain bearing for rotational mounting in schematic representation with an example of wear detection according to the invention.
Figure 1B:
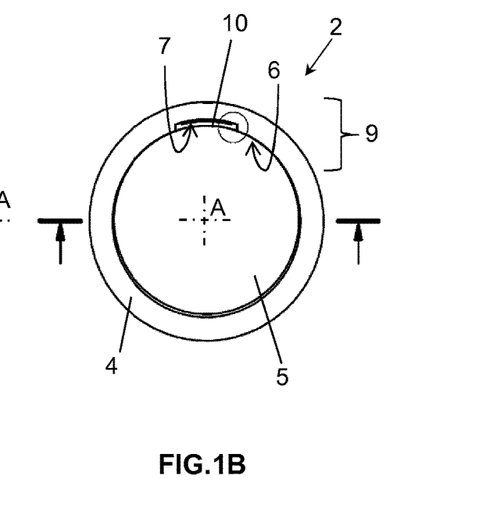
Figure 1C:
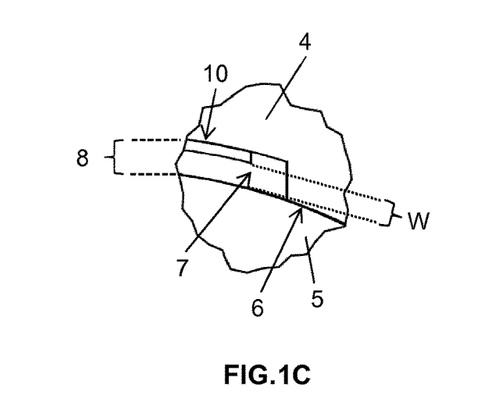
Figure 1D:
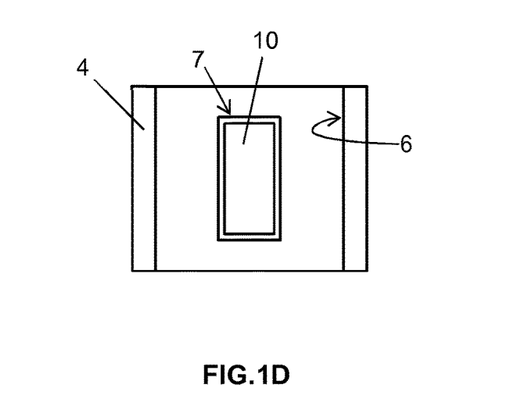
Figure 1E:
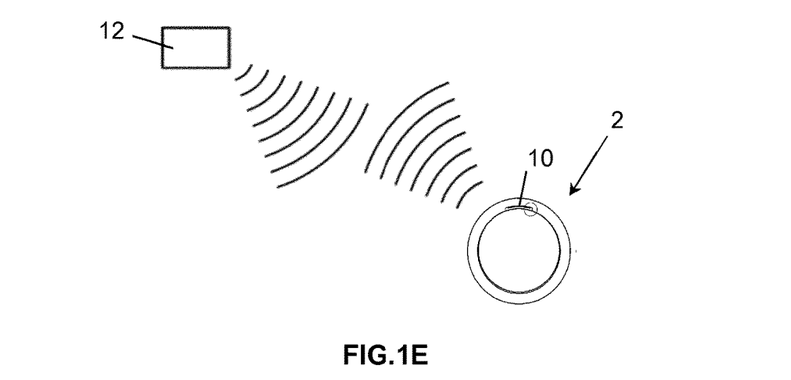

For wireless detection of the critical degree of wear, a transceiver suitable for the selected radio circuit 10, here for example an RFID reader 12, is provided, as shown in more detail in FIG. 1E. The plain bearing 2 is located in the transmit/receive range of the reader 12, which addresses the radio circuit(s) 10 via radio signals and monitors the response behavior thereof. A system for contactless wear detection in plain bearings 2 may thus be achieved. Each plain bearing 2 has at least one transponder as part of a radio circuit 10, the radio behavior of which changes when the predetermined degree of wear is reached, here for example when the wear limit W is perceptibly exceeded. The change may consist, in a simple embodiment, simply in the absence of a response signal. The response signal and its absence is detected by the reader 12.

The reader 12 in principle cooperates wirelessly with the radio circuit(s) 10 and monitors how the radio circuits 10 behave. The reader 12 may thus, depending for example on what is required for practical application of the plain bearing 2, trigger a maintenance alarm or an emergency stop.

Figure 2:
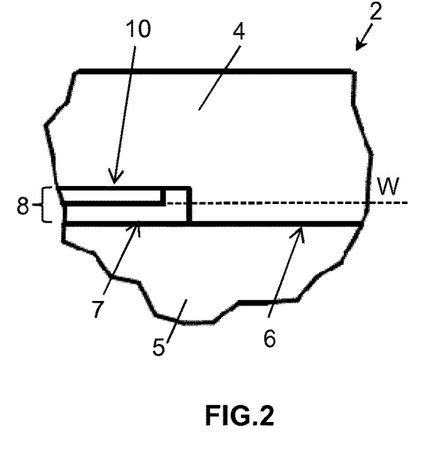
FIG. 2 is a schematic diagram in the form of an enlarged partial view of a plain bearing for a linear guide with an example of wear detection according to the invention.

The plain bearing in FIG. 2 differs from the plain bearing according to FIGS. 1A-1E solely in that it shows a linear guide system or flat guide. Accordingly, the sliding surface 6, guiding the second component 5, of the plastics sliding element 4 is embodied as a planar surface. A recess 7 is also provided here in or around a critical region 8 which accommodates a radio circuit 10 whose radio behavior changes when the friction-induced deterioration of the sliding element 4 reaches or exceeds the wear limit W.

Figure 3:
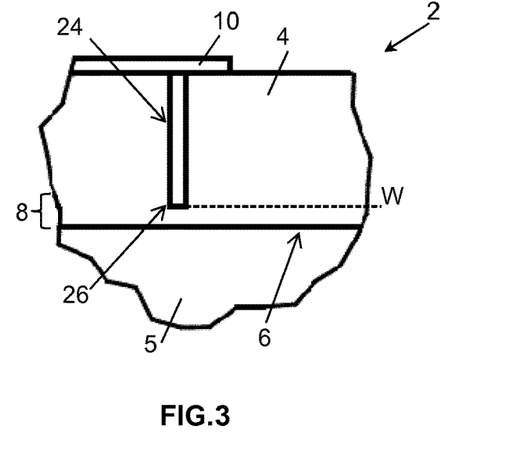
FIG. 3 shows an enlarged partial view of a plain bearing according to FIG. 2 with another example of wear detection according to the invention.

The plain bearing according to FIG. 3 is likewise embodied, by way of example, as a linear guide system or flat guide. The principle of this exemplary embodiment is however applicable mutatis mutandis to a bearing of the type according to FIGS. 1A-1E. In FIG. 3, the plastics sliding element 4 has no recess in its sliding surface 6 for the second component 5. Instead, a conductor portion is provided in the critical region 8 at the level of the wear limit W as a detector element 26. This may be achieved for example by molding in a U-shaped detector line 24 when manufacturing the plastics sliding element 4, in particular during the injection molding process. The detector element 26 is here spatially separate from the actual radio circuit 10 and electrically connected therewith via the detector line 24. The radio circuit 10 is arranged on the outside of the sliding element 4, on a side remote from the second component 5 or the sliding surface. This embodiment is particularly suitable for not impairing the sliding surface 6 and/or for radio circuits 10 with larger dimensions or smaller sliding elements. In this case too, the radio circuit 10 can be embodied as an RFID tag.

Figure 4:
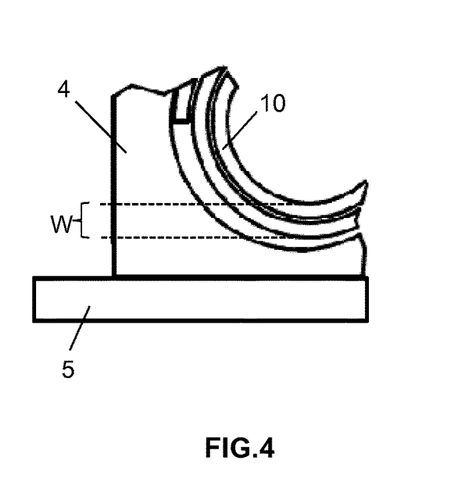
FIG. 4 shows an enlarged partial view, in a schematic diagram, of a plain bearing with a further example of wear detection according to the invention.

FIG. 4 shows an alternative example of a guide for linear motion. Here a block-shaped sliding element 4 is provided, which serves in plain bearing mounting of the second component 5 on the first component (not shown). The sliding element 4 has a receptacle, for example a cylindrical hole, for a spirally wound foil. The radio circuit 10 is mounted on the wound foil, for example as a flexible RFID tag. Thus, even under tight space conditions, for example in a sliding element 4 with smaller dimensions than required by the radio circuit 10, such a radio circuit may be provided. In this case, the receptacle is arranged in the sliding element 4 in such a way that excessive wear exposes the foil with the radio circuit 10, so laying it directly open to further wear. If the wear limit W is exceeded, the radio circuit 10 fails.

Figure 5:
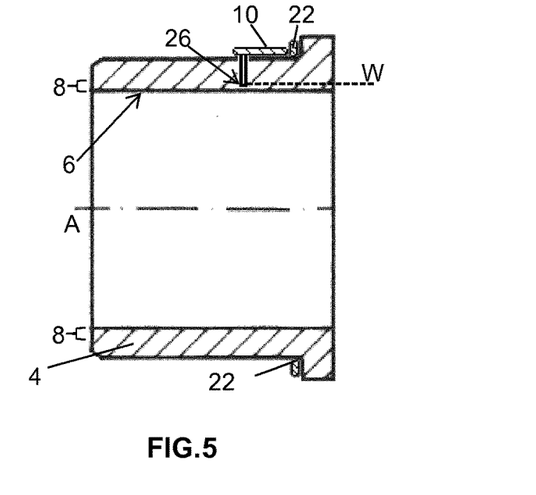
FIG. 5 shows a longitudinal section, in a schematic diagram, through a plain bearing bush with flange as an example of a sliding element, provided with a fourth example of wear detection according to the invention.

FIG. 5 in turn shows a further preferred exemplary embodiment of a sliding element 4 for a pivot bearing, namely a plain bearing bush of tribological plastics material, for example of a plastics material of the type Iglidur® G, W300, J, X or iglidur M250 from igus GmbH. The bearing housing and the second component are not shown here.

The sliding surface 6 of the sliding element 4 is likewise circular-cylindrical about the axis of rotation A in FIG. 5, with a critical region 8 in which the wear limit W is located. As in FIG. 3, the radio circuit 10 is here mounted at the outer circumference of the plain bearing bush 4 and is therefore preferably embodied as a flexible adhesive label, for example an RFID tag. The antenna 22 may, in particular if space is short in the case of a relatively small diameter plain bearing bush, be provided in the form of an induction coil 22 arranged separately on the rear disk surface of the flange of the bearing bush, as shown schematically in FIG. 5. FIG. 5 also provides a separate detector element 26 as part of a conductor loop, for example for a shunt. The inflection point of the conductor loop forms the detector element 26 and is located in the radial direction precisely at the distance of the predetermined wear limit W from the sliding surface 6. The conductor with the detector element 26 may subsequently be mounted in a hole, for example for selective retrofitting. The conductor with the detector element 26 may also be incorporated at the point of manufacture of the plain bearing bush 4, for example in the injection molding process. The electrical connection with the transponder of the radio circuit 10 is made in the latter case only as required after manufacture of the plain bearing bush 4, if contactless monitoring is desired.

In the exemplary embodiments according to FIGS. 1A-1E, FIG. 2 and FIG. 4, the radio circuits 10 themselves are each arranged directly in a critical region 8 at the level of the wear limit W of the plastics sliding element 4. In FIG. 3 and FIG. 5, in contrast, only the detector element is provided separately at the wear limit W. The position of the wear limit W is determined empirically, for example by endurance tests in a testing laboratory or by modeling.

Figure 15A:
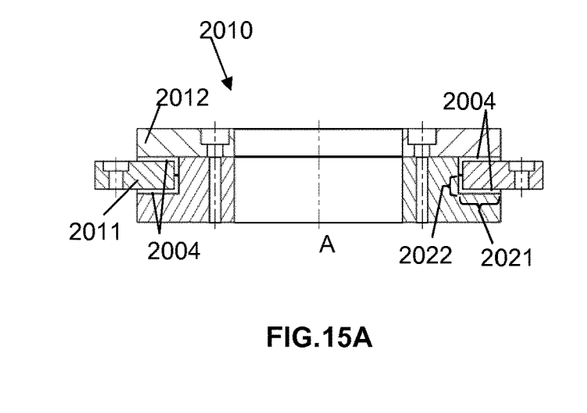
FIGS. 15A-15B show a cross-section (FIG. 15A) of an axial-radial plain bearing and an enlarged partial view of a sliding element therefor (FIG. 15B) as a further example of wear detection according to the invention.
Figure 15B:
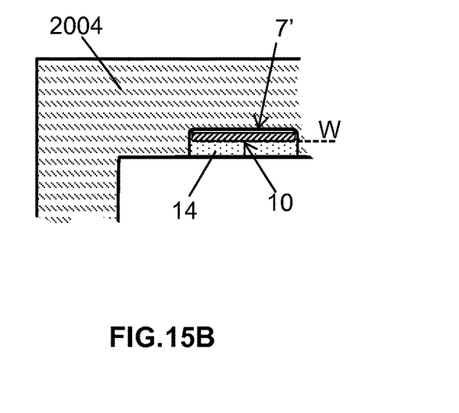

FIGS. 15A-15B show as a further example of application an axial-radial plain bearing 2010, with a first bearing ring 2011 and a second bearing ring 2012 of metal, for example of aluminum, or of fiber-reinforced plastics material. Known aspects of the construction and mode of operation of the axial-radial plain bearing 2010 are described in patent application WO 2014/154800 A1, to which reference is hereby made. FIGS. 15A-15B show sliding elements 2004 of a tribopolymer which are arranged between the bearing rings 2011, 2012, in the region of the receptacle in the second bearing ring 2012. In each case a plurality of sliding elements 2004 form mutually opposing sliding rings, which decouple the bearing rings 2011, 2012 axially and radially and form sliding surfaces therefor. To this end, in the cross-sectional plane according to FIG. 15A, the sliding elements 2004 each have an approximately L-shaped cross-section with an axial region 2021 and an approximately perpendicular radial region 2022.

FIG. 15B shows a sliding element 2004 in greater detail. The sliding element 2004 differs from known configurations firstly in a receptacle 7' in the tribopolymer preformed during manufacture, for example in the injection molding process. The receptacle 7' is, as also in the above examples, provided at a point which is known from experience to be susceptible to wear (for example relative to the bearing ring 2011) and is initially open to the outside. The sliding element 2004 in FIG. 15B is further distinguished according to the invention by a radio circuit 10, as described further below, which is arranged at the bottom of the receptacle 7'. The wear limit W typically lies in the range of a few tenths of a mm, i.e. approx. 0.3 to 0.9 mm, in particular approx. 0.5 to 0.7 mm. The wear limit W is determined on the one hand by the depth of the receptacle 7' and on the other hand by the structural height or thickness of the radio circuit 10.

The opening of the recess 7 which remains open towards the sliding surface, i.e. in front of the radio circuit 10, is preferably closed with a plastics sealing composition. It is possible to this end to introduce, for example according to FIG. 15B, a different plastics material which is less wear-resistant than the tribopolymer plastics material of the sliding element 2004, i.e. the radio circuit 10 is embedded in bonded manner in the sliding element and thus simultaneously encapsulated. Bonded embedding of the radio circuit 10, at least of the detector element 26, in the plastics material of the sliding element 4 or 2004 may also proceed for example by encapsulation by injection molding or casting in of the radio circuit 4 or 2004 or of the detector element 26 during injection molding manufacture of the sliding element, by subsequent molding on or filling with an encapsulating compound, or for example by an additive method such as 3D printing or the like. The embedded arrangement permanently fixes the position of the radio circuit 10 or of the detector element 26 and protects the radio circuit 10 from external influences.

The principle of wireless wear detection using radio circuits 10 is applicable to the detection of wear or deterioration by friction-induced abrasion through operation of the plain bearing 1, such as for example in the case of sliding plain bearings 1 (FIG. 1). The principle is equally applicable to the detection of cracking or fatigue fracture. All types of wear may arise through material fatigue due to aging or indeed prior to the end of the expected service life due to improper loading.

To detect wear, provision is made for the radio circuit 10 to change its transmit behavior in cooperation with a transceiver, for example with the RFID reader 12, as a result of mechanical loading. The change is intended to occur only once the associated sliding element 4 has reached a critical level of deterioration. The corresponding degree of wear is preferably selected, for example by positioning, such that a critical condition is signaled before the plain bearing 2 fails completely.

Figure 6:
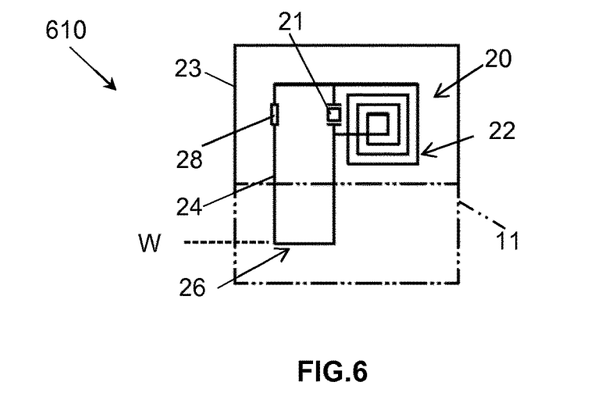
FIGS. 6-8 show schematic circuit diagrams of exemplary RFID radio circuits for wireless detection of predetermined deterioration in a region susceptible to wear.
Figure 7:
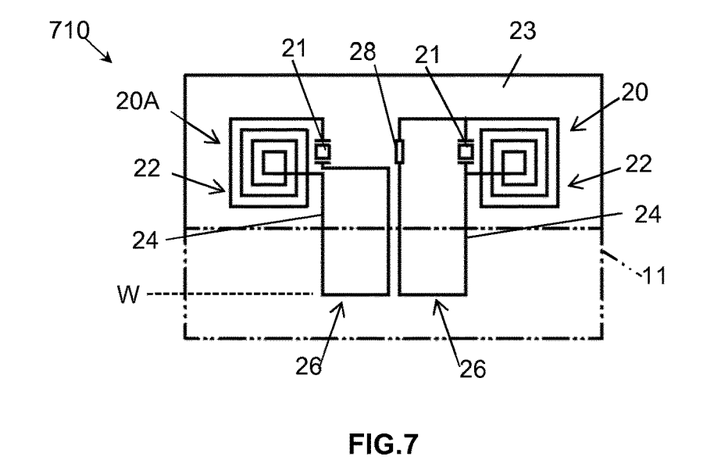
Figure 8:
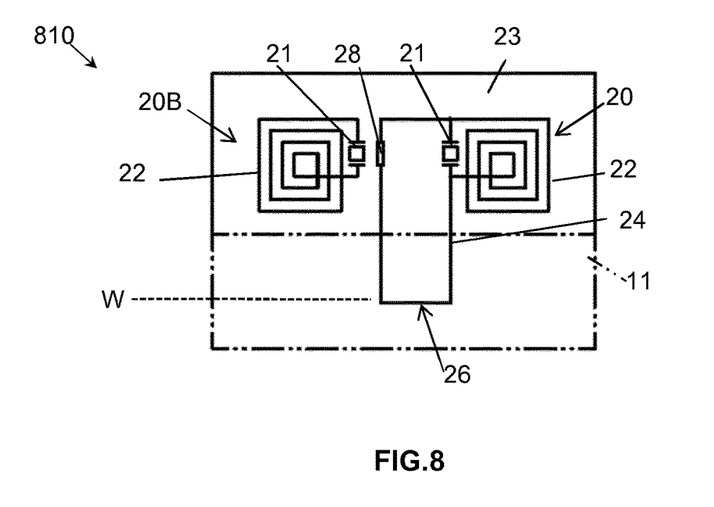

FIGS. 6-8 show possible exemplary embodiments of radio circuits 610, 710, 810, in particular for application according to FIG. 3 or FIG. 5, wherein only the structure and operation thereof are discussed below. The principle is also applicable to FIGS. 1-2 or FIG. 4.

The radio circuits 610, 710, 810 are embodied as passive RFID transponders for wireless communication in the UHF frequency range of the ISM band. To keep manufacture as inexpensive as possible, the RFID transponders 20 and 20A-20B respectively according to FIGS. 6-8 each comprise a conventional commercial RFID microchip 21, shown here schematically using a resonator symbol, with suitable RFID antenna 22.

The RFID microchip 21 has a memory with identification information and is supplied in each case via the RFID antenna 22 by the transmit power of the RFID reader 12. The RFID transponders 20 and 20A-20B respectively according to FIGS. 6-8 are thus passive and do not have their own separate power supply.

In FIG. 6, the terminals of the RFID microchip 21 are jumpered or "short-circuited" or mismatched with the RFID antenna 22 by means of a detector line 24. A line portion 26 of the detector line 24 is guided as a conductor loop in the critical region 8 in such a way that it breaks as the detector element 26 when the wear limit W is exceeded, i.e. the detector line 24 is interrupted. Thus, proper supply of the RFID microchip 21 by means of the RFID antenna 22 is only enabled when the critical wear limit W is exceeded. In other words, the RFID transponder 20 of the radio circuit 610 only becomes ready to transmit once the wear limit W to be detected has been reached or exceeded. Thus, for example, only by interruption can sufficient impedance matching or cancellation of a deliberate mismatch be brought about. To prevent induction-induced damage, the detector line 24 may be provided with a low-resistance shunt resistor 28. The actual RFID transponder 20, and the detector line 24 with its component parts may be fastened as a detection module to the same carrier 23, for example a breakable adhesive label, or for example cast into a brittle, fragile material.

FIG. 7 is a further development of the principle according to FIG. 6 and comprises two RFID transponders 20, 20A. The principle of operation of transponder 20A is the reverse of that of transponder 20. In the case of transponder 20A, supply of the RFID microchip 21 is not enabled, but rather is interrupted, in the case of breakage of the detector element 26 on the detector line 24. The RFID transponder 20 is in turn of identical construction to the transponder 20 of FIG. 6.

The combination according to FIG. 7 enables greater detection reliability to be achieved, in that on receipt of the proper signal from the first RFID transponder 20A and absence of the signal from the second RFID transponder 20 an operational condition without excessive wear may be assumed. Conversely, however, occurrence of the signal from the second RFID transponder 20 and absence of the signal from the first RFID transponder 20A signals with relatively high reliability that the wear limit W has been exceeded in the critical region 8. This takes place by two independent line portions acting as detector elements 26 being interrupted in response to wear. Here too, identification information for pairing the RFID transponders 20A, 20 and associating them with the affected plastics sliding element is stored, for example in the reader 12.

In a variant of FIG. 7 which is not shown, it is possible, as in FIG. 3, for the detector element 26 of the one transponder 20A to be stepped or spatially offset relative to the wear limit W, compared with the detector element 26 of the other transponder 20, in order to obtain additional information relating to the progress of wear over time and/or for monitoring purposes.

FIG. 8 shows a further exemplary embodiment with two RFID transponders 20, 20B, wherein one transponder 20B is provided merely for monitoring purposes as a permanent specimen, and its transmit behavior is not modified as a function of wear or deterioration. The other RFID transponder 20 is identical to or the same in principle as the transponder 20 according to FIGS. 6-7. In a variant of FIG. 8 which is not shown, the transponder 20B may, as in FIG. 3, be arranged with a part of its antenna as a predetermined breaking point in the critical region 8, such that a further, second wear limit may be detected, for example for an emergency stop.

Suitable systems and methods for radio-based acquisition of transponders are known to a person skilled in the art from the specialist literature and relevant standards (for example ISO 18000-1 or IEC 18000-6C or the like) and are not therefore explained in any greater detail.

Figure 9:
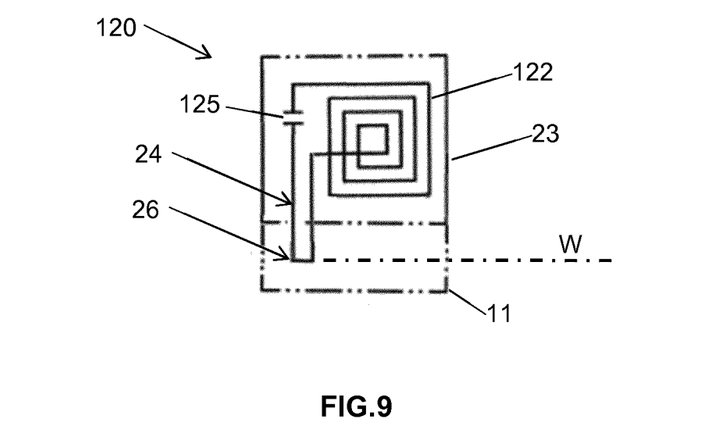
FIG. 9 shows a schematic circuit diagram of a particularly simple passive RF radio circuit in the form of an LC oscillating circuit for wireless acquisition of predetermined deterioration.

FIG. 9 shows a particularly simple radio circuit in the form of an RF transponder 120, wherein an LC oscillating circuit known for goods security (EAS: electronic article surveillance) was modified by a detector line 24 which forms a loop in the critical region 8 which serves as a detector element 26. In the operational condition, the oscillating circuit consisting of RF induction antenna 122 and RF capacitor 125 extracts transmit energy from an external electromagnetic HF field. The HF field is matched to the resonant frequency of the oscillating circuit, typically around 8.2 MHz, and thus the RF transponder 120 is detectable. To change the behavior of the RF transponder 120, the detector element 26 interrupts the connection between the RF induction antenna 122 and the RF capacitor 125 once the deterioration exceeds the wear limit W. The oscillating circuit thus become inactive and the RF transponder 120 is no longer detectable at the resonant frequency. A possible carrier 23 is in particular a special version of an adhesive label which comprises a break-susceptible critical region 8 as substrate for the conductor loop forming the detector element 26. The other features of the RF transponder 120 may correspond for example to the teaching of U.S. Pat. No. 3,810,147 or 3,500,373. The particularly inexpensive construction according to FIG. 9 is advantageous in particular with very large numbers of items.

Figure 10:
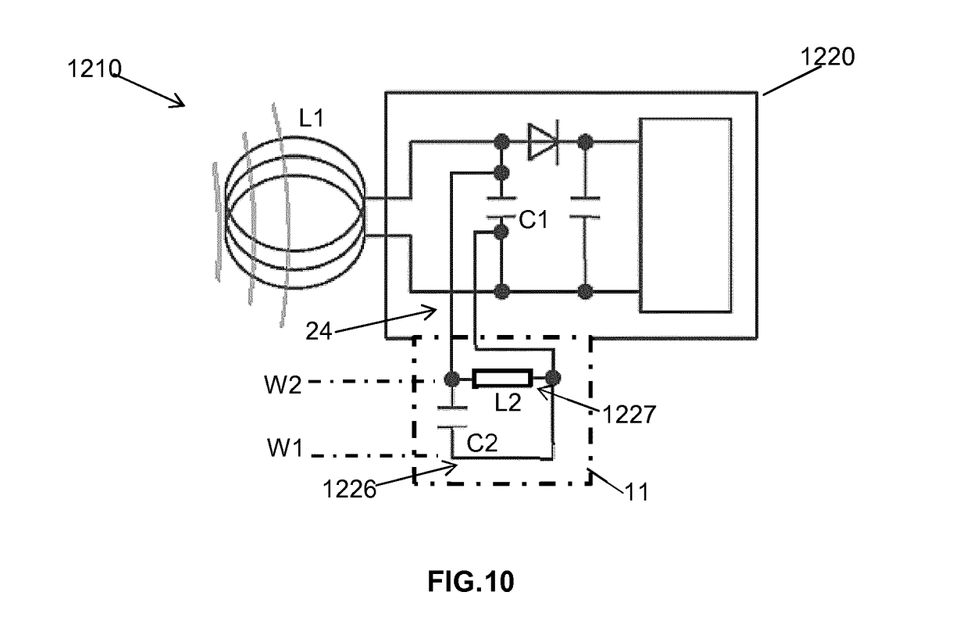
FIG. 10 is a schematic circuit diagram of a further radio circuit which is operational when new, not operational when a first wear limit is exceeded and operational once again when a second wear limit is exceeded.

FIG. 10 shows a further development of the RFID circuits according to FIGS. 6-8, to the effect that the radio circuit 1210 according to FIG. 10, which is operational when new, is not operational when a first wear limit W1 is exceeded and becomes operational again when a second wear limit W2 is exceeded. To change the radio behavior, a conductor with a parallel connection of an interference capacitor C2 and an interference coil L2 is connected to the detector line. A conductor loop in series with the interference capacitor C2 acts as the first detector element 1226 and decouples the interference capacitor C2 if the deterioration exceeds the first wear limit W1. The interference coil itself, which is destroyed by abrasion at the wear limit W2 acts as the second detector element 1227.

The parallel connection with L2 and C2 on the detector line 24 firstly impairs the resonant oscillating circuit only insignificantly due to low impedance of C2, such that in the unimpaired new state the RFID transponder 1220 is substantially operational and, at the resonant frequency, absorbs power for supplying the RFID chip. After isolation of the parallel connection of the interference capacitor C2, only the interference coil L2 continues to act. The impedance thereof is selected such that the resonant oscillating circuit is detuned relative to the resonant capacitor C1 and the resonant coil (antenna) L1 and no longer responds in resonant manner in the frequency range of the reader (FIG. 1). Thus, the RFID transponder 1220 is not functional with regard to the reader. The following applies to the values of the impedances: (a) $C2 \ll C1$ and (b) $L2 \ll L1*(C1/C2)$. If the deterioration reaches the second wear limit W2, the interference coil L2 becomes inactive and therefore the detuning of the vibration absorber is canceled again. The RFID transponder 1220 thus becomes properly operational again.

A multistage staggered detector arrangement as in FIG. 3 or FIG. 10 has the advantage that, at the start, the system allows functional testing via the reader 12 and may above all be fully automatically configured in that it automatically receives the identification information from all the radio circuits 1210 present. If return of previously detected identification information fails during subsequent operation, it may be concluded that a wear limit in the corresponding sliding element 4 has been exceeded.

FIG. 10 has the further advantage that, without multiplying the radio circuits 1210, supercritical wear may reliably be assumed if the identification information in question is detected again after a given time interval. An emergency stop is preferably triggered, since the worn conductor arrangement has not yet been renewed or repaired.

Figure 11:
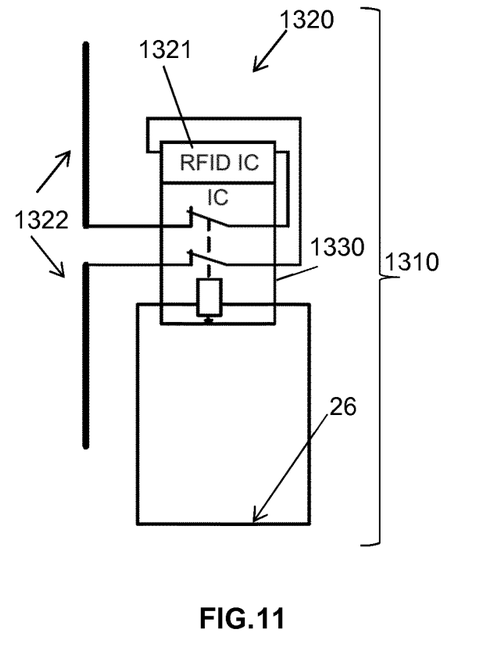
FIG. 11 is a schematic circuit diagram of an RFID radio circuit with UHF dipole antenna and a disconnecting device therefor.
Figure 12:
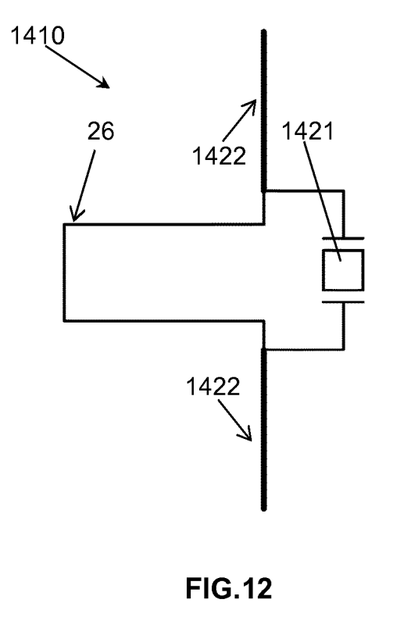
FIG. 12 is a schematic circuit diagram of an RFID radio circuit with UHF dipole antenna with a detector element which changes the antenna parameters.
Figure 13:
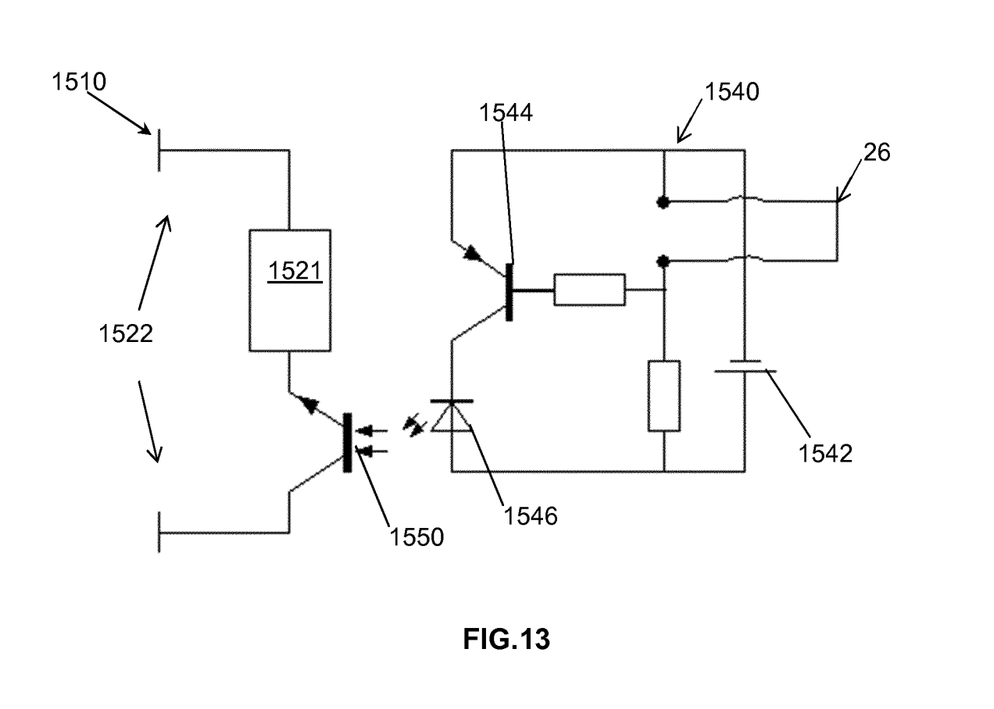
FIG. 13 is a schematic circuit diagram of an RFID radio circuit with UHF dipole antenna and a detector circuit.

FIG. 11-FIG. 13 show further exemplary embodiments of radio circuits 1310; 1410; 1510 for RFID-ICs with dipole antennae for the UHF frequency range, for example to ISO 18000-6C. These offer inter alia a higher range than LF or RF radio circuits (for example according to FIGS. 6-8 or FIG. 9) and may also be manufactured favorably as passive detection modules. The mode of operation and arrangement on the conductor arrangement for example corresponds to one of the above examples.

In the radio circuit 1310 according to FIG. 11, a dipole antenna 1322 may be switched via a specific IC 1330 (integrated circuit), for example an ASIC, in such a way that it may be electrically isolated from the RFID circuit 1321 in the manner of a switching relay or connected therewith. To this end, the IC 1330 has a transistor arrangement which connects the two nodes of the dipole antenna 1322 when a conductor loop used as detector element 1326 is severed. The detector element 1326 is connected with terminals of the IC 1330 which control the relay-like transistor arrangement. The RFID circuit 1321 may be embodied as an integrated component of the IC 1330. The radio circuit 1310 may be active, i.e. connected to a supply, or optionally also supplied passively via the dipole antenna 1322 from the radio transmission power.

In FIG. 12, a dipole antenna 1422 is jumpered with a conductor loop used as a detector element 26. In this way, the power parameters of the dipole antenna 1422 are influenced measurably, such that separation of the detector element 26 by wear is detectable using a suitable reader (cf. FIG. 1 or FIG. 4). In the UHF frequency range, a "short circuit" (unlike in the case of an induction antenna according to FIG. 6) does not under all conditions necessarily lead to failure of the radio signal, but rather to a detectable parameter change in the radio behavior, which is brought about by the RFID chip 1421 with the dipole antenna 1422. The radio circuit 1410 according to FIG. 11 is suitable as a purely passive system.

In the radio circuit 1510 according to FIG. 13, a dipole antenna 1522 is likewise connected to an RFID chip 1521. An active detector circuit 1540 with a voltage source 1542 here also comprises as detector element 26 a conductor loop isolatable by wear for arrangement in a wear-critical region. When the detector element 26 is isolated, the pnp transistor 1544 switches to open, such that the LED 1546 generates light and, in the manner of an optocoupler, switches the NPN phototransistor 1550 such that the dipole antenna 1522 is connected with low resistance to the terminals of the RFID chip 1521. A conventional optocoupler may be used for this purpose. In the event of an interruption in the detector element 26, the detector circuit 1540 thus enables connection of the dipole antenna 1522 with the RFID chip 1521, i.e. switches the RFID chip 1521 to operational readiness. The radio circuit 1510 is suitable as an active system, wherein the voltage source 1542 may also supply the RFID chip 1521 (not shown).

Figure 14A:
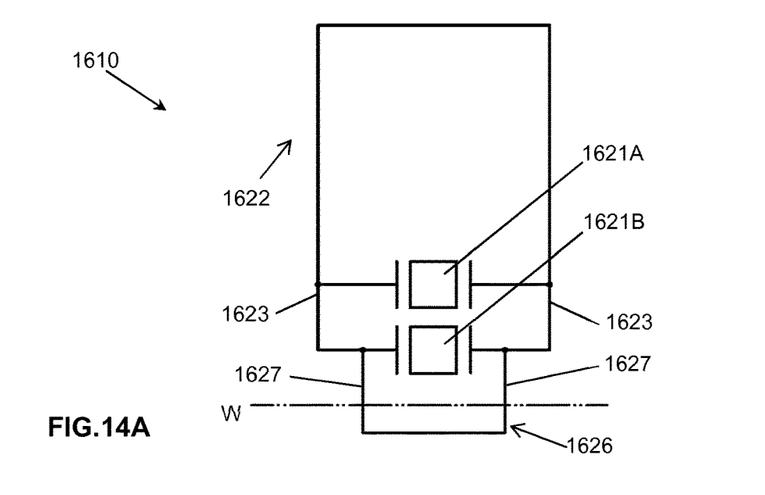
FIGS. 14A-14C are schematic circuit diagrams of further exemplary embodiments of RFID radio circuits which allow functional testing.
Figure 14B:
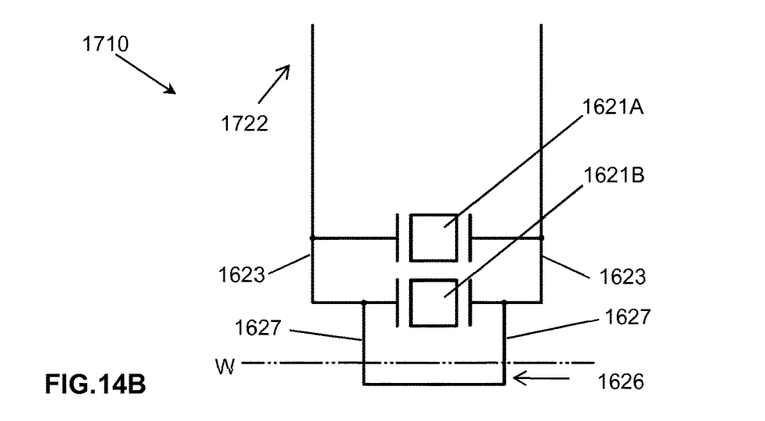
Figure 14C:
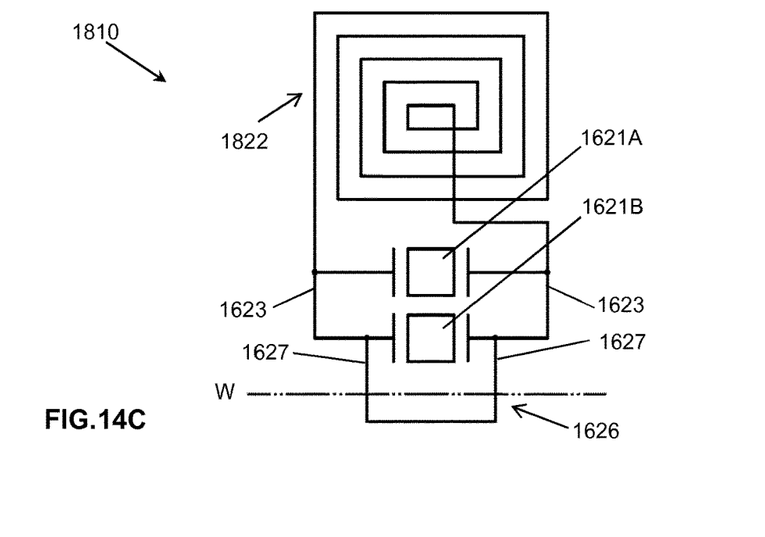

FIGS. 14A-14C show three further exemplary embodiments of radio circuits 1610, 1710, 1810, which differ from the above examples in particular in that in each exemplary embodiment the transponder in each case has two RFID chips 1621A, 1621B, which are both connected with a single common antenna 1622, 1722, 1822.

In the radio circuits 1610, 1710, 1810 first of all, when new and up to the critical wear level, for example when the wear limit W is exceeded, just the first RFID chip 1621A is ready to transmit and receive. Only when the detector element 1626 is isolated or removed by excessive wear, for example due to mechanical abrasion beyond the wear limit W, is the second RFID chip 1621B also virtually ready to transmit and receive. The identifiers or identification information of the RFID chips 1621A, 1621B differ from one another, however. Thus, the first RFID chip 1621A firstly allows functional testing of the radio circuits 1610, 1710, 1810 for example as to whether the wear detection is provided and/or operational. This monitoring proceeds on the basis of the previously known identifier of the first RFID chip 1621A. This is received by the reader and is stored for example in a database. This identifier may also be put to other use, for example for logistics purposes or to detect the system configuration.

The first RFID chip 1621A may be connected conductively (galvanically) or inductively with the antenna 1622, 1722 or 1822. The radio circuits 1610, 1710 or 1810 may in particular take the form of a PCB or FPC, wherein the antennas 1622, 1722 or 1822 are embodied as conductor tracks. To simplify the system, the RFID chips 1621A, 1621B used are preferably of like construction and are suitable conventional commercial integrated circuits (ICs), preferably for SMD or SMT technology.

In FIGS. 14A-14C, the second RFID chip 1621B is connected conductively via a transmission line 1623 with the common antenna 1622, 1722 or 1822 respectively. For a wear-induced change in the radio behavior of the second RFID chip 1621B, a stub 1627 is connected conductively in parallel to the transmission line 1623. The stub 1627 serves as a detector line and is embodied, in the example shown, as a two-wire line, for example similar to a "single shunt stub tuner" and short-circuited via a conductor portion located in the critical region (short-circuit stub). This conductor portion in the critical region forms the detector element 1626, as shown in FIGS. 14A-14C. The stub 1627 may alternatively be open or open-circuited (open-circuited stub not shown), but with conductor portions exposed in the critical region, which are isolated in the case of excessive wear beyond the wear limit W in order to serve as detector element 1626. Although the construction according to FIGS. 14A-14C is particularly simple, a double stub (similar to a "double shunt stub tuner") or a distinct matching network for example also falls within the scope of the invention.

The conductor track dimensions of the portion which forms the detector element 1626, and the conductor track dimensions of the conductor track portions of the stub 1627 remaining after excessive wear are adjusted in a predetermined ratio. Adjustment proceeds on the one hand such that, when new, a sufficient mismatch, in particular impedance mismatch, interferes with the transmit and receive readiness of the second RFID chip 1621B to such an extent that the latter can no longer communicate effectively with the reader. In particular, the stub 1627 with the detector element 1626 may impair passive supply and/or transmit power of the RFID chips 1621B to a sufficient degree. On the other hand, the ratio may additionally be adjusted in such a way that, after isolation of the detector element 1626, sufficient matching, in particular impedance matching, of the transmission line 1623, which connects the antenna 1622, 1722 or 1822 with the second RFID chip 1621B, is present. The stub 1627 may, in the condition without the detector element 1626 or without conductive connection thereto, in particular lead to extensive line matching or impedance matching relative to the additional transmission line 1623 at the second RFID chip 1621B. As a further parameter, in accordance with these preset values, the position of the connection point of the stub 1627 on the transmission line 1623 itself may also be adjusted. The wear-induced change in impedance matching here takes place with regard to the additional transmission line 1623 between antenna 1622, 1722, 1822 and the second RFID chip 1621B. The absolute line lengths of stub 1627 and detector element 1626 are adjustable over a given range because the conditions repeat substantially periodically with half the operating wavelength. An extension of n*λ/2 (with n being an integer) is possible with substantially uniform behavior.

Without being tied to any particular theory, the reflection at the connection point of the stub 1627 may be adjusted with regard to the first RFID chip 1621A by suitable selection of the overall length of the transmission line 1623 and of the position of the connection point thereof to the stub 1627 in such a way that the transmit behavior of the first RFID chips 1621A is not significantly impaired by the wear-induced change in condition, such that for example the range or transmit power of the first RFID chip 1621A when new and in the critical wear condition is changed only insignificantly. Notwithstanding the above, provision may alternatively be made (similar to the principle according to FIG. 7) for the second RFID chip 1621B to be receive- and transmit-ready in the event of critical wear, and for the first RFID chip 1621A virtually to fail, so likewise allowing functional testing in the non-critical condition.

In the case of wear close to or at the wear limit W, the second RFID chip 1621B is receive- and transmit-ready because of the matching occurring as a result of the absence of interference or a mismatch owing to the detector element 1626. The reader may thus receive the identifier of the second RFID chip 1621B, so leading to the conclusion that critical wear is present. The previously known identifier of the second RFID chip 1621B may also be stored to this end for example in a database.

The detector element 1626 is arranged in a region separated spatially from the RFID chips 1621A, 1621B and the common antenna 1610, 1710 or 1810 respectively, for example at an end of the PCB or FCB opposite the antenna 1610, 1710 or 1810 respectively and optionally at the back.

The exemplary embodiments according to FIGS. 14A-14C are particularly suitable for transponders or RFID chips 1621A, 1621B in the high-frequency range, for example at UHF, in particular for UHF RFID, for example with a fundamental frequency of 865 MHz to 955 MHz or 2.4 GHz (with wavelengths in the decimeter range). The principle of wear-induced change in line matching with the fundamental frequency as the detection principle is similar to the exemplary embodiments according to FIGS. 6-13. With open-circuited or short-circuited stubs of a suitably selected length, inductive or capacitive reactances of virtually zero to infinite may in principle be adjusted. The dimensioning of the conductor track dimensions of the detector element 1626 and the stub 1627 and determination of the connection point may proceed for example in a manner known per se with the assistance of the Smith diagram.

The radio circuits 1610, 1710, 1810 according to FIGS. 14A-14C differ from one another in the type of antenna used. The radio circuit 1610 in FIG. 14A has a loop dipole antenna 1622, while the radio circuit 1710 in FIG. 14B has a dipole antenna 1722. The latter offers space-saving construction. The radio circuit 1810 in FIG. 14A has an antenna coil 1822 for an optionally greater range. The antennas 1622, 1722, 1822 are each dimensioned to suit the selected fundamental frequency or the selected RFID chips 1621A, 1621B.

Finally, it should be noted that RFID transponders with IC and data memory, unlike 1-bit transponders (cf. FIG. 9), enable smarter systems which inter alia allow determination of the plain bearing 2 affected in relatively complex systems, more accurate location of the worn plastics sliding element 4, and for example also the use of a plurality of detector elements on one RFID chip (not shown), for example for more reliable detection. Functional testing, for example according to FIG. 7 or FIGS. 14A-14C, is made possible by uniquely associable identification information.

| List of reference numerals |
|---|
| FIGS. 1A-1E |
| 2 Plain bearing |
| 3 First component |
| 4 Plastics sliding element |
| 5 Second component |
| 6 Sliding surface |
| 7 Recess |
| 8 Critical region |
| 9 Segment under load |
| 10 Radio circuit |
| 12 RFID reader |
| A Axis |
| W Wear limit |
| FIG. 2 |
| 4 Plastics sliding element |
| 5 Second component |
| 6 Sliding surface |
| 7 Recess |
| 8 Critical region |
| 10 Radio circuit |
| W Wear limit |
| FIG. 3 |
| 4 Plastics sliding element |
| 5 Second component |
| 6 Sliding surface |
| 7 Recess |
| 8 Critical region |
| 10 Radio circuit |
| 24 Detector line |
| 26 Detector element |
| W Wear limit |
| FIG. 4 |
| 3 First component |
| 4 Plastics sliding element |
| 10 Radio circuit |
| W Wear limit |
| FIG. 4 |
| 3 First component |
| 4 Plastics sliding element |
| 10 Radio circuit |
| W Wear limit |
| FIG. 5 |
| 4 Plastics sliding element |
| 6 Sliding surface |
| 8 Critical region |
| 10 Radio circuit |
| 22 Antenna |
| 26 Detector element |
| W Wear limit |
| A Axis |
| FIGS. 6-8 |
| 8 Critical region |
| 20, 20A, 20B RFID transponder |
| 21 RFID microchip |
| 22 RFID antenna |
| 23 Carrier |
| 24 Detector line |
| 26 Detector element |
| 28 Shunt resistor |
| 610, 710, 810 Radio circuit |
| W Wear limit |
| FIG. 9 |
| 8 Critical region |
| 24 Detector line |
| 26 Detector element |
| 120 RF transponder |
| 122 RF induction antenna |

List of reference numerals

| |
|---|
| 125 RF capacitor |
| 23 Carrier |
| W Wear limit |
| FIG. 10 |
| 24 Detector line |
| 1210 Radio circuit |
| 1221 RFID chip |
| 1226, 1227 Detector elements |
| 1220 RFID transponder |
| C1 Resonant capacitor |
| L1 Resonant coil (antenna) |
| C2 Interference capacitor |
| L2 Interference coil |
| W1, W2 Wear limits |
| FIG. 11 |
| 26 Detector element |
| 1310 Radio circuit |
| 1321 RFID chip |
| 1320 RFID transponder |
| 1322 Dipole antenna |
| 1330 IC |
| FIG. 12 |
| 26 Detector element |
| 1410 Radio circuit |
| 1421 RFID chip |
| 1422 Dipole antenna |
| FIG. 13 |
| 26 Detector element |
| 1510 Radio circuit |
| 1521 RFID chip |
| 1522 Dipole antenna |
| 1540 Detector circuit |
| 1542 Voltage source |
| 1544 Transistor (PNP) |
| 1546 LED |
| 1550 Phototransistor (NPN) |
| FIGS. 14A-14C |
| 1610, 1710, 1810 Radio circuit |
| 1621A RFID chip |
| 1621B RFID chip |
| 1622, 1722, 1822 Antenna |
| 1623 Transmission line |
| 1626 Detector element |
| 1627 Stub |
| FIGS. 15A-15B |
| 7' Receptacle |
| 10 Radio circuit |
| 14 Plastics sealing composition |
| 2004 Tribopolymer sliding element |
| 2010 Axial-radial plain bearing |
| 2011, 2012 Bearing rings |
| 2021 Axial region |
| 2022 Radial region |
| W Wear limit |

The invention claimed is:

1. A plain bearing for a lubricant-free bearing arrangement comprising:
a first component including at least one replaceable sliding element, the at least one sliding element is an injection molded part made of plastics material, which has a sliding bearing surface for mobile guidance of a second component relative to the first component,
wherein the first component has a device for detecting wear in a critical region of the at least one sliding element at the sliding bearing surface of the sliding element, the device comprising a radio circuit and at least one detector element arranged on the sliding element which cooperates with the radio circuit,
wherein the at least one detector element changes a behavior of the radio circuit at a predetermined degree of wear in the critical region, such that the wear-induced change is wirelessly detectable, to signal that the sliding element is to be replaced,
wherein the at least one detector element is arranged spatially separate from the radio circuit in a receptacle or a recess in the sliding element, wherein the receptacle or the recess is prefabricated in this sliding element,
wherein the at least one detector element is electrically connected with the radio circuit via a detector line through at least partially an electrical connection for selective retrofitting or for subsequent connecting if required, and
wherein the radio circuit arranged on the first component is remote from the sliding bearing surface and is provided outside the critical region of the sliding element.

2. The plain bearing as claimed in claim 1, wherein the at least one sliding element has the recess in the sliding bearing surface, and the at least one detector element is arranged in the recess.

3. The plain bearing as claimed in claim 2, wherein the at least one sliding element has the receptacle in the sliding bearing surface, and the at least one detector element is embedded in a bonded manner in the receptacle.

4. The plain bearing as claimed in claim 1, wherein the radio circuit is a passive or active transponder.

5. The plain bearing as claimed in claim 1, wherein the first component includes a number of sliding elements, and a plurality of the sliding elements of the number of sliding elements each have at least one detector element, respectively, and the detector elements each are connected with the radio circuit as a common radio circuit.

6. The plain bearing as claimed in claim 1, wherein the at least one detector element is embodied as a line portion of the detector line, which extends in the critical region and is interrupted when the predetermined degree of wear is reached.

7. The plain bearing as claimed in claim 6, wherein the transponder includes an antenna which is short-circuited or mismatched via the at least one detector element and the at least one detector element opens the short circuit of the antenna or cancels the mismatch when the predetermined degree of wear is reached.

8. The plain bearing as claimed in claim 1, wherein the radio circuit includes an antenna, and the at least one detector element is embodied as part of the antenna which is interrupted when the predetermined degree of wear is reached.

9. The plain bearing as claimed in claim 1, wherein the radio circuit is embodied as a passive RFID transponder with a microchip which stores identification information.

10. The plain bearing as claimed in claim 1, wherein the at least one detector element is embodied as a passive circuit component and/or as a conductor portion.

11. The plain bearing as claimed in claim 1, wherein the critical region forms a defined predetermined breaking point of the sliding element, which triggers the detector element when the predetermined degree of wear is reached.

12. The plain bearing as claimed in claim 1, wherein the first component, with an exception of the device for detecting wear, predominantly or exclusively includes plastics material.

13. The plain bearing as claimed in claim 12, wherein the first component consists of the at least one sliding element, a bearing housing, and the device for detecting wear.

14. The plain bearing as claimed in claim 12, wherein the first component consists of the at least one sliding element and the device for detecting wear.

15. A plain bearing arrangement comprising a plain bearing as claimed in claim 1 and the second component, wherein the second component includes at least one of a shaft, a rail, or a joint head.

16. The plain bearing arrangement as claimed in claim 15, wherein the plain bearing is embodied as a pivot bearing, a linear guide, an axial-radial bearing or a spherical plain bearing that mounts the second component with a corresponding degree of freedom or with corresponding degrees of freedom.

17. The plain bearing as claimed in claim 1, wherein the at least one sliding element has the receptacle in the sliding bearing surface, and the at least one detector element is embedded in a bonded manner in the receptacle.

18. A plain bearing for a lubricant-free bearing arrangement comprising:
a first component including at least one sliding element, the at least one sliding element being a separate injection molded part made of plastics material, which has a sliding bearing surface for mobile guidance of a second component relative to the first component,
wherein the first component has a device for detecting wear in a critical region of the at least one sliding element at the sliding bearing surface of the sliding element, the device comprising a radio circuit and at least one detector element arranged on the sliding element which cooperates with the radio circuit,
wherein the at least one detector element changes a behavior of the radio circuit at a predetermined degree of wear in the critical region, such that the wear-induced change is wirelessly detectable,
wherein the at least one detector element is arranged spatially separate from the radio circuit in a receptacle or a recess in the sliding element prefabricated with this sliding element,
wherein the at least one detector element is electrically connected with the radio circuit via a detector line through at least partially an electrical connection for selective retrofitting or for subsequent connecting if required,
wherein the radio circuit arranged on the first component is remote from the sliding bearing surface and is provided outside the critical region of the sliding element, and
wherein the first component includes a number of sliding elements each being a separate injection molded part made of plastics material, and a plurality of the sliding elements of the number of sliding elements each have at least one detector element, respectively, and the detector elements each are connected with the radio circuit as a common radio circuit.

* * * * *